United States Patent
Toake et al.

(10) Patent No.: US 9,854,791 B2
(45) Date of Patent: Jan. 2, 2018

(54) DUAL-BEARING REEL AND REEL UNIT FOR SAME

(71) Applicant: Shimano Inc., Sakai, Osaka (JP)

(72) Inventors: Youhei Toake, Osaka (JP); Satoshi Ikebukuro, Osaka (JP); Takanori Maruoka, Osaka (JP); Motohiro Niitsuma, Osaka (JP)

(73) Assignee: Shimano Inc., Sakai, Osaka (JP)

( * ) Notice: Subject to any disclaimer, the term of this patent is extended or adjusted under 35 U.S.C. 154(b) by 0 days.

(21) Appl. No.: 15/266,586

(22) Filed: Sep. 15, 2016

(65) Prior Publication Data

US 2017/0172131 A1    Jun. 22, 2017

(30) Foreign Application Priority Data

Dec. 18, 2015 (JP) ................................. 2015-246865

(51) Int. Cl.
*A01K 89/01* (2006.01)
*A01K 89/033* (2006.01)
(Continued)

(52) U.S. Cl.
CPC .......... *A01K 89/045* (2015.05); *A01K 89/006* (2013.01); *A01K 89/01555* (2013.01);
(Continued)

(58) Field of Classification Search
CPC .......... A01K 89/0155; A01K 89/01555; A01K 89/01931
See application file for complete search history.

(56) References Cited

U.S. PATENT DOCUMENTS 4,618,106 A * 10/1986 Noda ............... A01K 89/01555
242/290
4,830,308 A * 5/1989 Puryear ............ A01K 89/01555
242/288
(Continued)

FOREIGN PATENT DOCUMENTS

JP    H10309158 A    11/1998
JP    2001145445 A    5/2001
(Continued)

OTHER PUBLICATIONS

Decision to grant patent for Japanese Patent Application No. 2015-246865 dated Jan. 26, 2017, 6 pp.

*Primary Examiner* — Emmanuel M Marcelo
(74) *Attorney, Agent, or Firm* — United IP Counselors, LLC (57) ABSTRACT

A dual-bearing reel includes a reel unit, a handle, a spool, and a spool brake. The handle is rotatably mounted to the reel unit. The spool is in the reel unit, and rotates in conjunction with a rotation of the handle. The spool includes a bobbin trunk, a first flange, and a second flange. The first flange is on a first end of the bobbin trunk, and the second flange is on a second end of the bobbin trunk. The bobbin trunk includes a bored tubular part and a non-bored tubular part. The bored tubular part includes at least one hole, and the non-bored tubular part is integrated with the bored tubular part. The spool brake is in the reel unit, and can apply a braking force to the spool by applying a magnetic force to at least the non-bored tubular part.

18 Claims, 7 Drawing Sheets

(51) Int. Cl.
*A01K 89/00* (2006.01)
*A01K 89/0155* (2006.01)

(52) U.S. Cl.
CPC ............ *A01K 89/05* (2015.05); *A01K 89/057* (2015.05); *A01K 89/058* (2015.05)

(56) References Cited

U.S. PATENT DOCUMENTS

| | | | | |
|---|---|---|---|---|
| 5,692,693 | A * | 12/1997 | Yamaguchi | A01K 89/01555 242/288 |
| 7,159,813 | B2 * | 1/2007 | Ikuta | A01K 89/01555 242/288 |
| 7,503,517 | B2 * | 3/2009 | Ikuta | A01K 89/01555 242/286 |
| 7,648,096 | B2 * | 1/2010 | Niitsuma | A01K 89/01555 242/286 |
| 8,967,517 | B2 * | 3/2015 | Ikebukuro | A01K 89/01555 242/286 |
| 9,101,120 | B2 * | 8/2015 | Hyun | A01K 89/0155 |
| 9,101,121 | B2 * | 8/2015 | Niitsuma | A01K 89/01555 |

FOREIGN PATENT DOCUMENTS

| | | | |
|---|---|---|---|
| JP | 2002291380 | A | 10/2002 |
| JP | 2014200227 | A | 10/2014 |

* cited by examiner

DUAL-BEARING REEL AND REEL UNIT FOR SAME

CROSS-REFERENCE TO RELATED APPLICATIONS

This application claims priority to Japanese Patent Application No. 2015-246865 filed on Dec. 18, 2015, the entirety of which is hereby incorporated by reference in its entirety.

BACKGROUND

Technical Field

The present disclosure relates to a dual-bearing reel and a spool for the same.

Background Information

In well-known dual-bearing reels, a bobbin trunk of a spool includes a plurality of holes in order to produce the spool with a lightweight construction (see Japan Laid-open Patent Application Publication No. 2001-145445). When described in detail, the bobbin trunk interposed between a pair of flanges includes the holes in a large part of its entirety.

Incidentally, spool brake devices for braking a spool with a magnetic force have been proposed in order to prevent occurrence of a backlash (see Japan Laid-open Patent Application Publications Nos. 2014-200227 and H10-309158). The spool brake devices are configured to change the magnitude of the force to brake the spool in accordance with the number of the magnetic fluxes passing through the spool.

In the dual-bearing reel described in Japan Laid-open Patent Application Publication No. 2001-145445, the bobbin trunk of the spool includes the plural holes in a large part of its entirety. Hence, in order to brake the spool of this dual-bearing reel as described in Japan Laid-open Patent Application Publication No. 2014-200227, it has been required to provide the spool with a closed-end tubular conductor and to unitarily rotate the closed-end tubular conductor with the spool as described in Japan Laid-open Patent Application Publication No. H10-309158. Because of this, even when reduction in weight (inertia) of the spool is achieved by holes, increase in weight (inertia) of the spool is inevitable by the conductor. This has made it difficult to sufficiently brake the spool.

BRIEF SUMMARY

The present disclosure has been produced in view of the aforementioned drawback. It is an object of the present disclosure to provide a dual-bearing reel in which a spool is produced having a lightweight construction and able to produce a braking force, of a suitable magnitude, that can be applied to the spool.

(1) A dual-bearing reel according to an aspect of the present disclosure includes a reel unit, a handle, a spool and a spool brake. The handle is rotatably mounted to the reel unit. The spool is disposed in the reel unit and rotates in conjunction with a rotation of the handle. The spool includes a bobbin trunk and a pair of flanges. The bobbin trunk includes a bored tubular part and a non-bored tubular part. The bored tubular part includes at least one hole. The non-bored tubular part is integrated with the bored tubular part. The flanges are respectively provided on both ends of the bobbin trunk. The spool brake is disposed in the reel unit. The spool brake is configured to apply a braking force to the spool by applying a magnetic force to at least the non-bored tubular part.

According to the present dual-bearing reel, the bobbin trunk includes the bored tubular part. Hence, the spool can be produced having a lightweight construction. Additionally, the magnetic force of the spool brake is applied to the non-bored tubular part of the bobbin trunk. Hence, a braking force of a suitable magnitude can be applied to the spool.

(2) In a dual-bearing reel according to another aspect of the present disclosure, the spool brake is disposed in the reel unit and can face an inner peripheral surface of the non-bored tubular part. Therefore, it is possible to achieve an advantageous effect of compactly producing the dual-bearing reel in addition to the aforementioned advantageous effect.

(3) In a dual-bearing reel according to another aspect of the present disclosure, the bored tubular part includes a rib protruding radially inward from an inner peripheral surface thereof. Therefore, even when the bored tubular part is provided with the at least one hole, it is possible to reliably achieve a strength and a rigidity required for the bored tubular part. Additionally, even when the bored tubular part is provided with the hole, it is possible to minimize a reduction in a strength and a rigidity between the bored tubular part and the non-bored tubular part. In other words, it is possible to inhibit difference in amount of deformation between the bored tubular part and the non-bored tubular part.

(4) In a dual-bearing reel according to another aspect of the present disclosure, the rib is an annular rib circumferentially extending on the inner peripheral surface of the bored tubular part. Therefore, it is possible to more effectively inhibit difference in amount of deformation between the bored tubular part and the non-bored tubular part.

(5) In a dual-bearing reel according to another aspect of the present disclosure, the inner peripheral surface of the non-bored tubular part includes a small diameter part and a large diameter part having a larger diameter than the small diameter part. The spool brake is disposed in the reel unit and can face the small diameter part.

In this construction, it is possible to manage the magnetic force applied to the small diameter part from the spool brake with reference to a boundary between the small diameter part and the large diameter part on the inner peripheral surface of the non-bored tubular part. In other words, a braking force of a suitable magnitude can be applied to the spool.

(6) In a dual-bearing reel according to another aspect of the present disclosure, the inner peripheral surface of the non-bored tubular part includes a step extending circumferentially. The step connects the small diameter part and the large diameter part. Even with this construction, advantageous effects similar to those described above can be achieved.

(7) In a dual-bearing reel according to another aspect of the present disclosure, the small diameter part is connected to the large diameter part through the step, and the large diameter part is provided continuously to one of the flanges. Even with this construction, advantageous effects similar to those described above can be achieved.

(8) A spool for a dual-bearing reel according to an aspect of the present disclosure includes a bobbin trunk made in a tubular shape and a pair of flanges. The bobbin trunk enables a fishing line to be wound about an outer periphery thereof. The flanges are respectively provided on both ends of the bobbin trunk.

The bobbin trunk includes a bored tubular part and a non-bored tubular part. The bored tubular part is provided on one side of the bobbin trunk closer to one of the flanges. The bored tubular part includes a through hole in an outer periphery thereof. The non-bored tubular part is provided on the other side of the bobbin trunk closer to the other of the flanges. When a spool brake of a magnetic type is disposed to face the inner peripheral surface of the non-bored tubular part of the bobbin trunk in this construction, it is possible to produce the dual-bearing reel having a lightweight construction, and able to apply a braking force of a suitable magnitude to the spool without adding a closed-end tubular conductor to the dual-bearing reel.

Overall, according to the present disclosure, the spool can be produced having a lightweight construction, and a braking force of a suitable magnitude can be applied to the spool.

BRIEF DESCRIPTION OF THE DRAWINGS

Referring now to the attached drawings which form a part of this original disclosure.

DETAILED DESCRIPTION OF EMBODIMENTS

<Construction of Dual-Bearing Reel>

Figure 1:
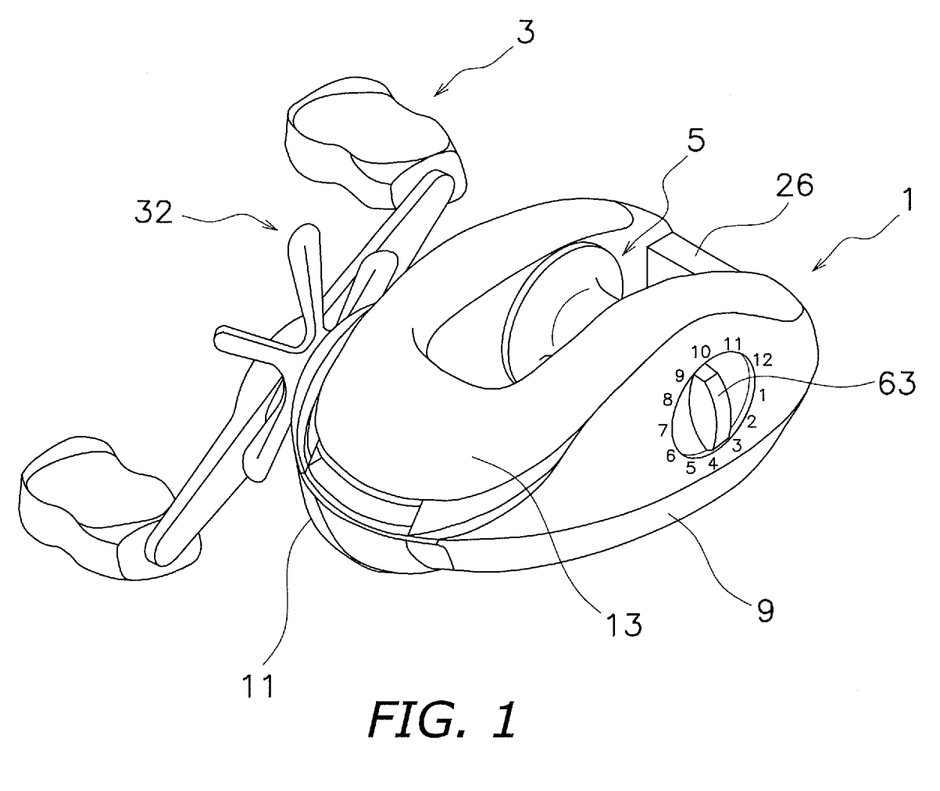
FIG. 1 is a perspective view of a dual-bearing reel employing a preferred embodiment of the present disclosure.
Figure 2:
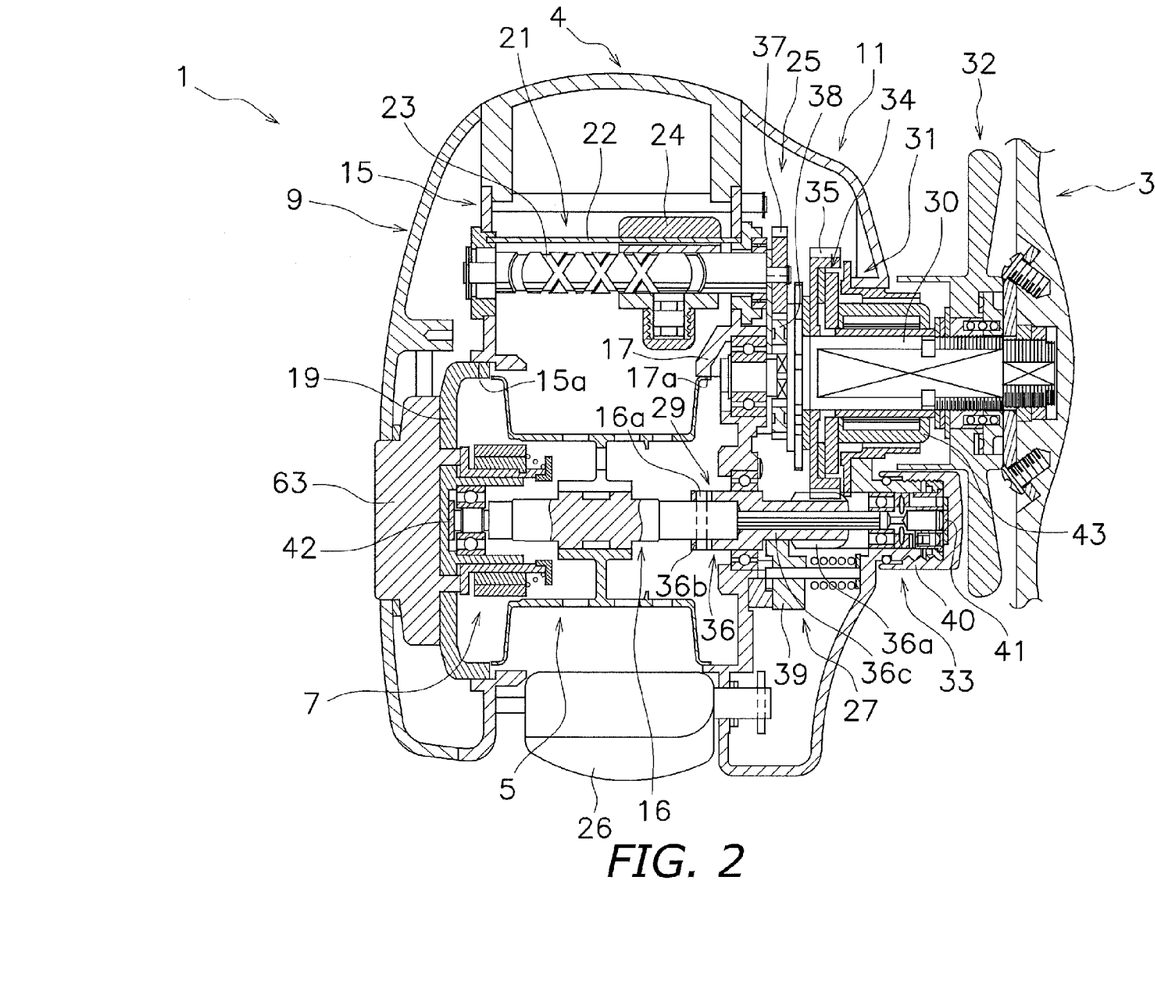
FIG. 2 is a cross-sectional view of an internal construction of a reel unit.

FIG. 1 shows a dual-bearing reel employing a preferred embodiment of the present disclosure. As shown in FIGS. 1 and 2, the dual-bearing reel includes a reel unit 1, a handle 3, a spool 5 and a spool brake mechanism 7.

In the following explanation, the term "forward" and its related terms may be used for expressing a direction in which a fishing line is forwardly reeled out, whereas the term "backward" and its related terms may be used for expressing a direction opposite to the direction in which the fishing line is forwardly reeled out. Additionally, the term "downward" and its related terms may be used for expressing a direction in which the reel unit 1 is attached to a fishing rod, whereas the term "upward" and its related terms may be used for expressing a direction opposite to the direction in which the reel unit 1 is attached to the fishing rod.

Moreover, the extending direction of a spool shaft 16, that of a pinion gear 36 and that of a worm shaft 23 are substantially the same. Therefore, the term "axial" and its related terms may be hereinafter used for expressing these directions. It should be noted that the spool shaft 16, the pinion gear 36 and the worm shaft 23 will be described below.

(Reel Unit)

As shown in FIG. 2, the reel unit 1 includes a frame 4, a pair of first and second side covers 9 and 11, and a thumb rest 13 (see FIG. 1) mounted to the top of the frame 4.

The frame 4 includes a first side plate 15, a second side plate 17 and a plurality of coupling portions (not shown in the drawings). The first side plate 15 and the second side plate 17 are disposed to face each other at a predetermined interval. When described in detail, the first side plate 15 is disposed on the opposite side of the frame 4 from the handle 3, whereas the second side plate 17 is disposed on the same side of the frame 4 as handle 3 (handle 3 side). The first side plate 15 includes an opening 15a, whereas the second side plate 17 includes an opening 17a. The openings 15a and 17a enable the spool 5 to be disposed therein. The plural coupling portions couple the first side plate 15 and the second side plate 17.

A brake case 19 is fixed to the opening 15a. The brake case 19 is a closed-end tubular case member. The brake case 19 is mounted to the opening 15a of the first side plate 15 by, for instance, a bayonet structure. Additionally, the spool brake mechanism 7 is disposed in the opening 15a through the brake case 19 in order to inhibit occurrence of a backlash in casting.

The first side cover 9 is mounted to the frame 4 (e.g., the first side plate 15) on the opposite side of the handle 3. The second side cover 11 is detachably mounted to the frame 4 (e.g., the second side plate 17) on the handle 3 side. An operating knob 63 is disposed between the first side cover 9 and the brake case 19 in order to operate the spool brake mechanism 7.

The spool 5, a lever wind mechanism 21 and a clutch operating lever 26 are disposed in the frame 4.

The level wind mechanism 21 is a mechanism for evenly winding the fishing line about the spool 5. The level wind mechanism 21 includes a guide tube 22, the worm shaft 23 and a line guide 24. The guide tube 22 guides the line guide 24 in the axial direction. The guide tube 22 is fixed between the first side plate 15 and the second side plate 17. The worm shaft 23 is rotatably disposed within the guide tube 22. A helical groove is provided on the worm shaft 23, and the line guide 24 is meshed with the helical groove.

With the aforementioned construction, the line guide 24 is reciprocated along the guide tube 22 when the worm shaft 23 is rotated by a gear mechanism 25 (to be described). Accordingly, the fishing line inserted through the line guide 24 can be evenly wound about the spool 5.

The clutch operating lever 26 is disposed between the first side plate 15 and the second side plate 17, and is also disposed backward of the spool 5. The clutch operating lever 26 is capable of sliding in the up-and-down direction. The clutch operating lever 26 is capable of actuating a clutch engaging/disengaging mechanism 27 (to be described) through a clutch cam (not shown in the drawings).

The gear mechanism 25, the clutch engaging/disengaging mechanism 27, a clutch mechanism 29, a drag mechanism 31 and a casting control mechanism 33 are disposed between the frame 4 and the second side cover 11.

The gear mechanism 25 is configured to transmit a rotational force from the handle 3 to the spool 5 and the level wind mechanism 21. The gear mechanism 25 includes a drive gear 35, the pinion gear 36, a first gear 37 and a second gear 38.

The drive gear 35 is mounted to a drive shaft 30, and rotates unitarily therewith or relative thereto. When described in detail, the drive gear 35 is rotated unitarily with, or relative to, the drive shaft 30 in accordance with the action of the drag mechanism 31. The pinion gear 36 is rotatably supported by the second side plate 17. The pinion gear 36 is mounted to the spool shaft 16, and is axially movable. The pinion gear 36 is made in a substantially tubular shape. The pinion gear 36 is a component, through the center of which the spool shaft 16 is inserted.

The pinion gear 36 is meshed with the drive gear 35. The first gear 37 is fixed to an end of the worm shaft 23. The second gear 38 is non-rotatably fixed to the drive shaft 30, and is meshed with the first gear 37. With the aforementioned construction, the first gear 37 meshed with the second gear 38 is rotated when the drive shaft 30 is rotated. Then, the worm shaft 23 is rotated by the rotation of the first gear 37. Thus, the level wind mechanism 21 is actuated as described above.

The clutch engaging/disengaging mechanism 27 is configured to engage or disengage the clutch mechanism 29 in response to operating the clutch operating lever 26. The clutch engaging/disengaging mechanism 27 includes a clutch yoke 39. The clutch engaging/disengaging mechanism 27 is configured to move the clutch yoke 39 in parallel to the axis of the spool shaft 16 in response to operating the clutch operating lever 26. Accordingly, the clutch mechanism 29 is turned off and the spool 5 becomes rotatable. By contrast, when the drive shaft 30 is rotated in a fishing-line winding direction, the clutch engaging/disengaging mechanism 27 is configured to move the clutch yoke 39 such that the clutch mechanism 29 is automatically turned on.

The clutch mechanism 29 is configured to couple/decouple the drive shaft 30 and the spool shaft 16 to/from each other. The clutch mechanism 29 is composed of a meshing part 36b of the pinion gear 36 and a clutch pin 16a radially penetrating the spool shaft 16.

The pinion gear 36 herein includes a tooth part 36a, the meshing part 36b and a narrowed part 36c. The tooth part 36a is provided on one end of the pinion gear 36, and is meshed with the drive gear 35. The meshing part 36b is provided on the other end of the pinion gear 36. The meshing part 36b includes a recess engaged with the clutch pin 16a. The narrowed part 36c is provided between the tooth part 36a and the meshing part 36b. The clutch yoke 39 of the clutch engaging/disengaging mechanism 27 is engaged with the narrowed part 36c.

The clutch pin 16a is engaged with the recess of the meshing part 36b. For example, when the pinion gear 36 is moved along the spool shaft 16 by the clutch yoke 39 of the clutch engaging/disengaging mechanism 27, the recess of the meshing part 36b is disengaged from the clutch pin 16a. Accordingly, the drive shaft 30 and the spool shaft 16 are decoupled from each other. In this case, a rotation from the drive shaft 30 is not transmitted to the spool 5. In other words, this state is referred to as a clutch-off state.

By contrast, when the drive shaft 30 is rotated in the fishing-line winding direction, the clutch pin 16a is engaged with the recess of the meshing part 36b. Accordingly, the drive shaft 30 and the spool shaft 16 are coupled to each other. In this case, a rotation from the drive shaft 30 is transmitted to the spool 5. In other words, this state is referred to as a clutch-on state. It should be noted that the clutch-on state is established as a normal state.

The drag mechanism 31 is configured to brake the spool 5 when the fishing line is released. This will be hereinafter explained in detail. When the fishing line is pulled by a force with a greater magnitude than a drag force, the drag mechanism 31 is actuated and the spool 5 is rotated in a fishing-line releasing direction.

The drag mechanism 31 includes a star drag 32 and a friction mechanism 34. The star drag 32 regulates the magnitude of the drag force. When described in detail, the pressing state of the friction mechanism 34 is changed by rotating the star drag 32, thereby regulating the magnitude of the drag force.

The friction mechanism 34 is composed of a plurality of brake plates. The friction mechanism 34 is disposed between a one-way clutch 43 and the drive gear 35. For example, when the fishing line is pulled by a force with a greater magnitude than the drag force and the spool 5 is thereby rotated in the fishing-line releasing direction, the friction mechanism 34 is actuated and the drive gear 35 is rotated relative to the drive shaft 30.

The casting control mechanism 33 is configured to brake the spool 5 by holding both ends of the spool shaft 16 and pressing them from both axial sides. The casting control mechanism 33 includes a cap 40, a first friction plate 41 and a second friction plate 42. The first and second friction plates 41 and 42 make contact with both ends of the spool shaft 16, and interpose and hold the spool shaft 16 therebetween. For example, when the cap 40 is rotated, the magnitude of a force to hold and press the spool shaft 16 by the first and second friction plates 41 and 42 is regulated. Accordingly, the magnitude of a force to brake the spool 5 is regulated.

(Handle)

The handle 3 is rotatably mounted to the reel unit 1. When described in detail, as shown in FIGS. 1 and 2, the handle 3 is disposed laterally to the reel unit 1 and is rotatably mounted to the reel unit 1. The drive shaft 30 is mounted to the handle 3, and rotates unitarily with the handle 3. The drive shaft 30 is rotatably supported by the second side plate 17 and the second side cover 11. The drive shaft 30 is herein rotatably supported by the second side plate 17 through a bearing, and is also rotatably supported by the second cover 11 through the one-way clutch 43. The one-way clutch 43 is configured to prevent the drive shaft 30 from rotating in the fishing-line releasing direction, but is configured to allow the drive shaft 30 to rotate in the fishing-line winding direction. The one-way clutch 43 is mounted to the second side cover 11, and supports the drive shaft 30. In this case, the rotation of the handle 3, i.e., the rotation of the drive shaft 30, is transmitted to the drive gear 35 through the one-way clutch 43 and the drag mechanism 31, and thereby, the spool 5 is rotated.

(Spool)

Figure 3:
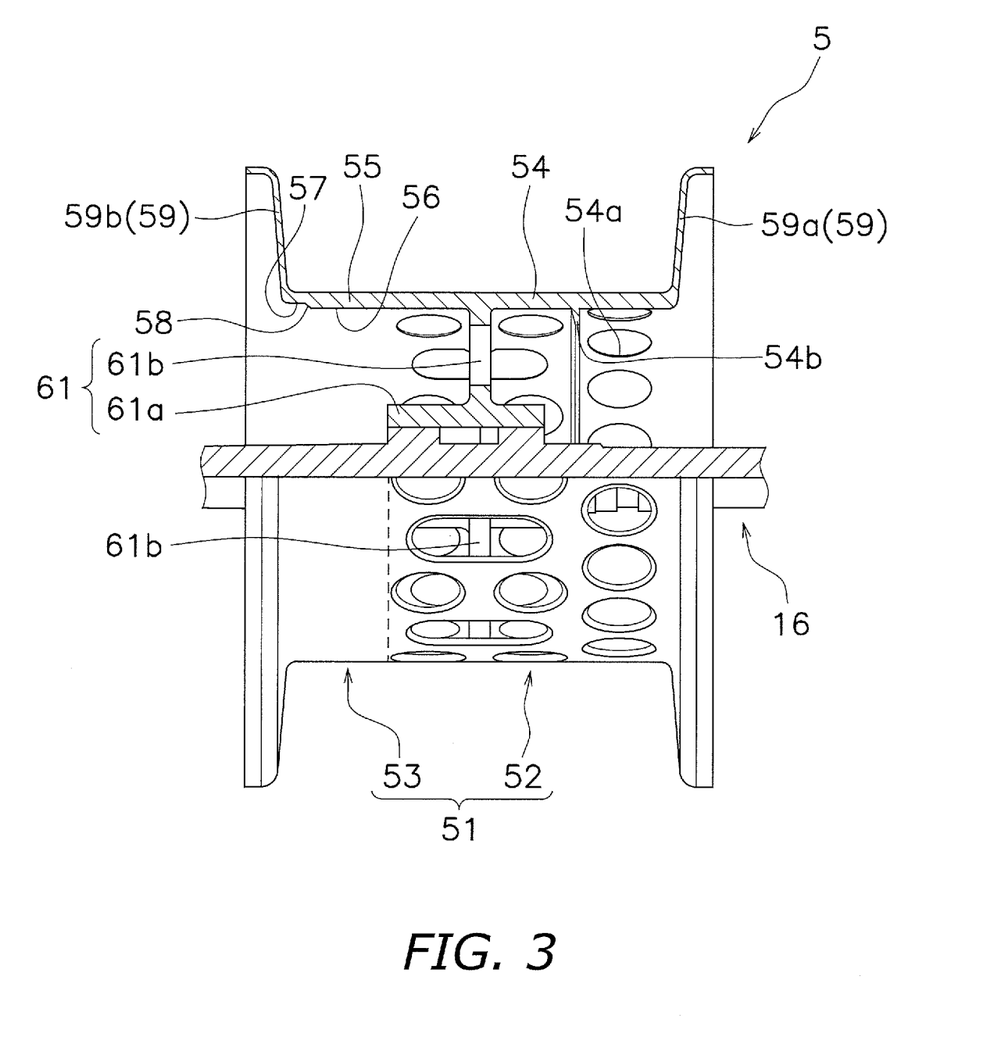
FIG. 3 is a diagram shown in the form of a cross-sectional view and a side view of a spool.

The spool 5 is made of a non-magnetic conductor, for instance, aluminum alloy. As shown in FIGS. 1 and 2, the spool 5 is disposed in the reel unit 1, and rotates in conjunction with the rotation of the handle 3. As shown in FIG. 3, the spool 5 includes a bobbin trunk 51, a pair of flanges 59 and a mount part 61.

One of the pair of flanges 59 (e.g., the flange disposed on the handle 3 side) will be hereinafter expressed as a first flange 59a on an as-needed basis. On the other hand, the other of the pair of flanges 59 (e.g., the flange disposed on the opposite side of the handle 3) will be hereinafter expressed as a second flange 59b on an as-needed basis.

The fishing line is wound onto the outer periphery of the bobbin trunk 51. The bobbin trunk 51 is made in a substantially tubular shape. The bobbin trunk 51 includes a bored tubular part 52 and a non-bored tubular part 53.

The bored tubular part 52 is a part that contributes to weight reduction (inertia reduction) of the spool 5. Accordingly, the bored tubular part 52 is an example of a weight reduction means. The bored tubular part 52 is provided on at least a part located on the first flange 59a side. As shown in FIG. 3, the bored tubular part 52 is herein composed of a region located in the vicinity of the first flange 59a and a region located axially in the middle of the first flange 59a and the second flange 59b.

Specifically, the bored tubular part 52 includes a first body 54, a plurality of holes 54a and a rib 54b. The first body 54 is made in a substantially tubular shape. The first body 54 composes part of the bobbin trunk 51, i.e., a part disposed on the handle 3 side. The first body 54 is integrated with the first flange 59a and is also integrated with a second body 55 (to be described) of the non-bored tubular part 53.

The fishing line is wound onto the outer peripheral surface of the first body 54. The inner peripheral surface of the first body 54 is connected to that of the second body 55 of the non-bored tubular part 53. In other words, the inner peripheral surface of the first body 54 is formed continuously with that of the second body 55. Additionally, the inner peripheral surface of the first body 54 is continuously connected to the outer surface of the first flange 59a.

The plural holes 54a are through holes penetrating the first body 54 from its inner peripheral surface to its outer peripheral surface. In other words, the plural holes 54a are radially penetrating through holes, and are provided through the first body 54. Specifically, the plural holes 54a are provided in the circumferential direction of the first body 54, and are disposed within an axial range from the region located in the middle of the first flange 59a and the second flange 59b to the first flange 59a. In other words, the plural holes 54a are provided in the circumferential direction of the first body 54, and are disposed on both sides of a web 61b (to be described) of the mount part 61 in the axial direction, on the outside of the web 61b of the mount part 61 in the radial direction, and in the vicinity of the first flange 59a.

It should be noted that the range of the bored tubular part 52 (the first body 54) corresponds to a region in which the plural holes 54a are provided. When described in detail, the boundary between the bored tubular part 52 and the non-bored tubular part 53 is defined by the inner peripheral surfaces of some holes 54a disposed farthest from the first flange 59a. In FIG. 3, this boundary is depicted with dashed line.

The rib 54b is provided on the inner peripheral surface of the bored tubular part 52. The rib 54b is herein made in an annular shape. Specifically, the rib 54b is disposed between two axially adjacent groups of holes 54a. The rib 54b is provided on the first body 54 and protrudes radially inward from the inner peripheral surface of the bored tubular part 52 (e.g., the inner peripheral surface of the first body 54). Additionally, the rib 54b is provided on the first body 54 and circumferentially extends on the inner peripheral surface of the first body 54.

Figure 4:
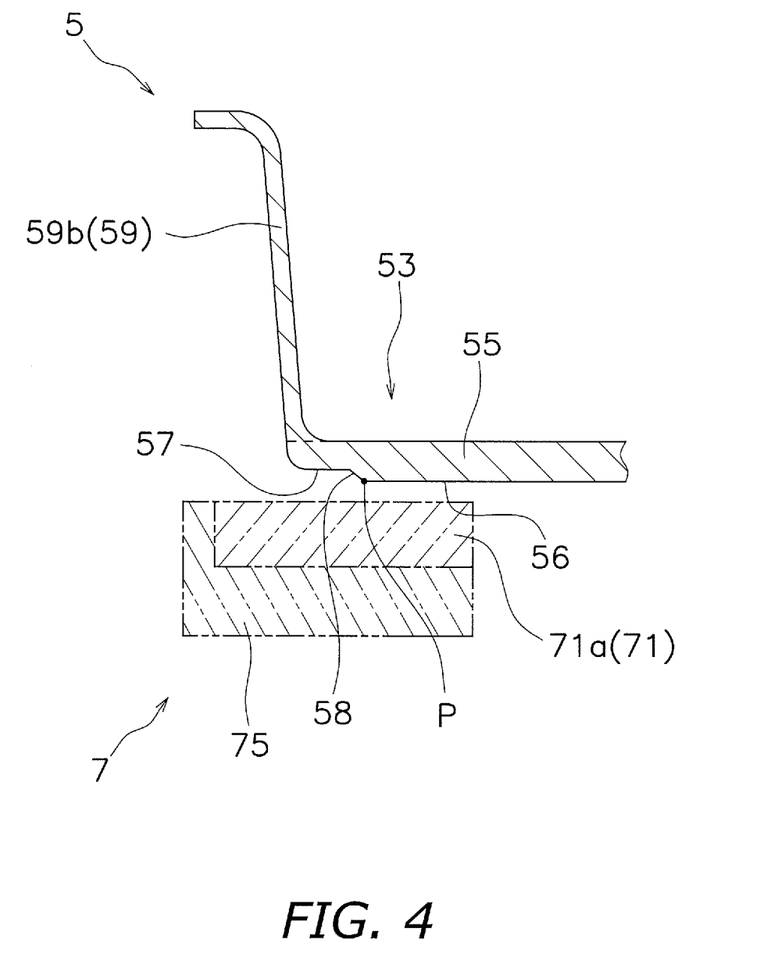
FIG. 4 is a partially enlarged cross-sectional view of the spool.

The non-bored tubular part 53 is a part braked by the magnetic force of the spool brake mechanism 7. Accordingly, the non-bored tubular part 53 is an example of a brake force receiving means. As shown in FIGS. 3 and 4, the non-bored tubular part 53 is provided on the second flange 59b side.

Specifically, the non-bored tubular part 53 includes the second body 55, a small diameter part 56, a large diameter part 57 and a step 58. The second body 55 is made in a substantially tubular shape. The second body 55 composes part of the bobbin trunk 51, i.e., a part disposed on the opposite side of the handle 3. The second body 55 is integrated with the first body 54, and is also integrated with the second flange 59b.

The fishing line is wound onto the outer peripheral surface of the second body 55. In other words, the outer peripheral surface of the bobbin trunk 51 is formed by the outer peripheral surface of the aforementioned first body 54 and that of the second body 55. The inner peripheral surface of the second body 55 is connected to that of the first body 54 of the bored tubular part 52. In other words, the inner peripheral surface of the second body 55 is formed continuously with that of the first body 54.

Specifically, the inner peripheral surface of the second body 55 is composed of the small diameter part 56, the large diameter part 57 and the step 58. The small diameter part 56 composes part of the inner peripheral surface of the second body 55. The small diameter part 56 is connected to the large diameter part 57 through the step 58. Additionally, the small diameter part 56 is connected to the inner peripheral surface of the first body 54. The small diameter part 56 herein has an equal inner diameter to the first body 54.

The spool brake mechanism 7 can face the small diameter part 56. A corner P, formed by the small diameter part 56 and the step 58, is herein used as a reference for managing the magnetic force to be applied to the small diameter part 56 by the spool brake mechanism 7. Thus, the corner P is an example of a referencing means.

For example, the corner P circumferentially extends on the inner peripheral surface of the bobbin trunk 51, i.e., on the small diameter part 56. The corner P defines a line for delimiting the small diameter part 56 on the inner peripheral surface of the bobbin trunk 51. The diameter of the small diameter part 56 is herein made constant in the axial direction. Therefore, it is possible to easily manage an area through which magnetic fluxes cross (i.e., a magnetic flux crossing area) in the small diameter part 56 with reference to the corner P. For example, the magnetic flux crossing area increases with an increase in axial length of the small diameter part 56 from the corner P. Hence, it is possible to stabilize fluctuation in a braking force to be applied to the spool 5.

It should be noted that it is difficult to define the line delimiting the small diameter part 56 without providing the corner P on the inner peripheral surface of the bobbin trunk 51. In this case, for instance, curved parts are provided on both ends of the inner peripheral surface of the bobbin trunk 51. Additionally, a constant diameter part is provided between the curved parts provided on both ends. In this construction, chances are that in forming the curved parts, the positions of boundaries between the curved parts and the constant diameter part fluctuate in the axial direction. Because of this fluctuation, it is difficult to stabilize the magnetic flux crossing area in the constant diameter part in comparison with the aforementioned construction provided with the corner P. In other words, it is difficult to stabilize fluctuation in braking force to be applied to the spool 5.

The large diameter part 57 has a larger diameter than the small diameter part 56. The large diameter part 57 composes part of the inner peripheral surface of the second body 55. The large diameter part 57 is connected to the small diameter part 56 through the step 58. The large diameter part 57 is continuously connected to the outer surface of the second flange 59b.

The step 58 is a connecting part between the small diameter part 56 and the large diameter part 57. The step 58 extends in the circumferential direction and composes part of the inner peripheral surface of the second body 55 in a position between the small diameter part 56 and the large diameter part 57. When described in detail, the diameter of the step 58 increases from the small diameter part 56 to the large diameter part 57, and composes part of the inner peripheral surface of the second body 55.

As shown in FIG. 3, the first and second flanges 59a and 59b are made in substantially saucer shapes. The first and second flanges 59a and 59b are respectively provided on both ends of the bobbin trunk 51. When described in detail, each of the first and second flanges 59a and 59b is integrally provided on a relevant one of the ends of the bobbin trunk 51, and extends radially outward therefrom. It should be noted that a part with a curved surface (including part of the outer peripheral surface of the bobbin trunk 51) and a part disposed radially outside the part with the curved surface are collectively defined as each of the first and second flanges 59a and 59b. In FIG. 4, the boundary between the first (second) flange 59a (59b) and the bobbin trunk 51 is depicted with a dashed line.

As shown in FIG. 3, the mount part 61 includes a boss 61a and the web 61b. The boss 61a is made in a substantially tubular shape. The boss 61a is mounted to the spool shaft 16. When described in detail, the boss 61a is non-rotatably fixed to the spool shaft 16 by fixation means (e.g., serration coupling). The web 61b is made in a substantially annular shape. The web 61b couples the boss 61a and the bobbin trunk 51. When described in detail, the web 61b is integrated with the outer peripheral surface of the boss 61a and the inner peripheral surface of the bobbin trunk 51.

As shown in FIGS. 2 and 3, the spool shaft 16 is mounted to the spool 5 and rotates unitarily with the spool 5. The spool shaft 16 penetrates the second side plate 17 and extends to the second side cover 11. One end of the spool shaft 16 is rotatably supported by the second side cover 11 through a bearing. Additionally, the other end of the spool shaft 16 is rotatably supported by the brake case 19 through another bearing. Moreover, as described above, the spool shaft 16 is fixed at an intermediate part between its one end and its other end to the spool 5 (the boss 61a of the mount part 61). With the aforementioned construction, the spool shaft 16 is rotated together with the spool 5.

(Spool Brake Mechanism)

The spool brake mechanism 7 is capable of braking the spool 5 by the magnetic force. When described in detail, the spool brake mechanism 7 is configured to brake the spool 5 by applying a force to the spool 5 in the reverse direction to the rotational direction of the spool 5. The spool brake mechanism 7 is herein configured to brake the spool 5 by applying a force to at least the non-bored tubular part 53 of the spool 5 in the reverse direction to the rotational direction of the spool 5.

Figure 5:
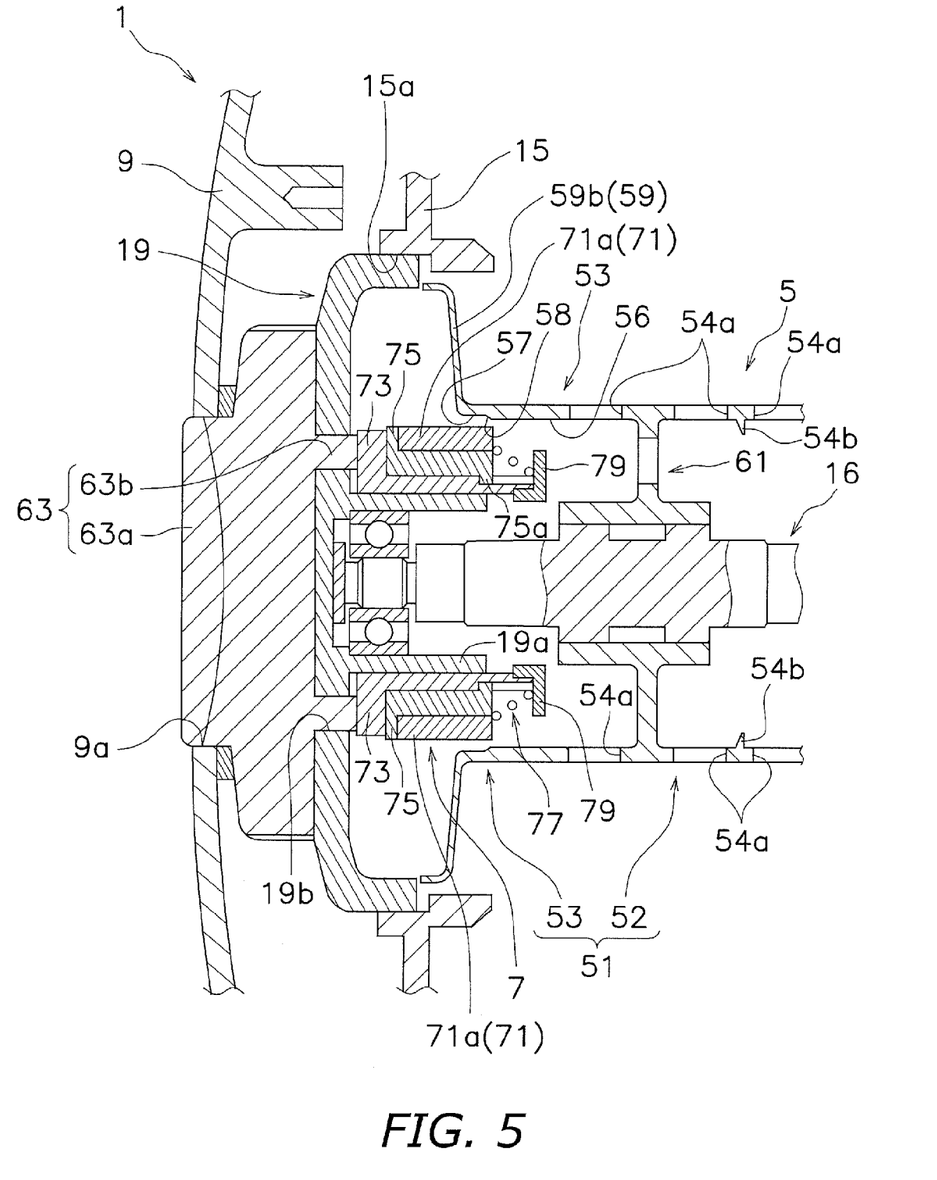
FIG. 5 is an enlarged cross-sectional view of the spool and a spool brake mechanism.
Figure 6:
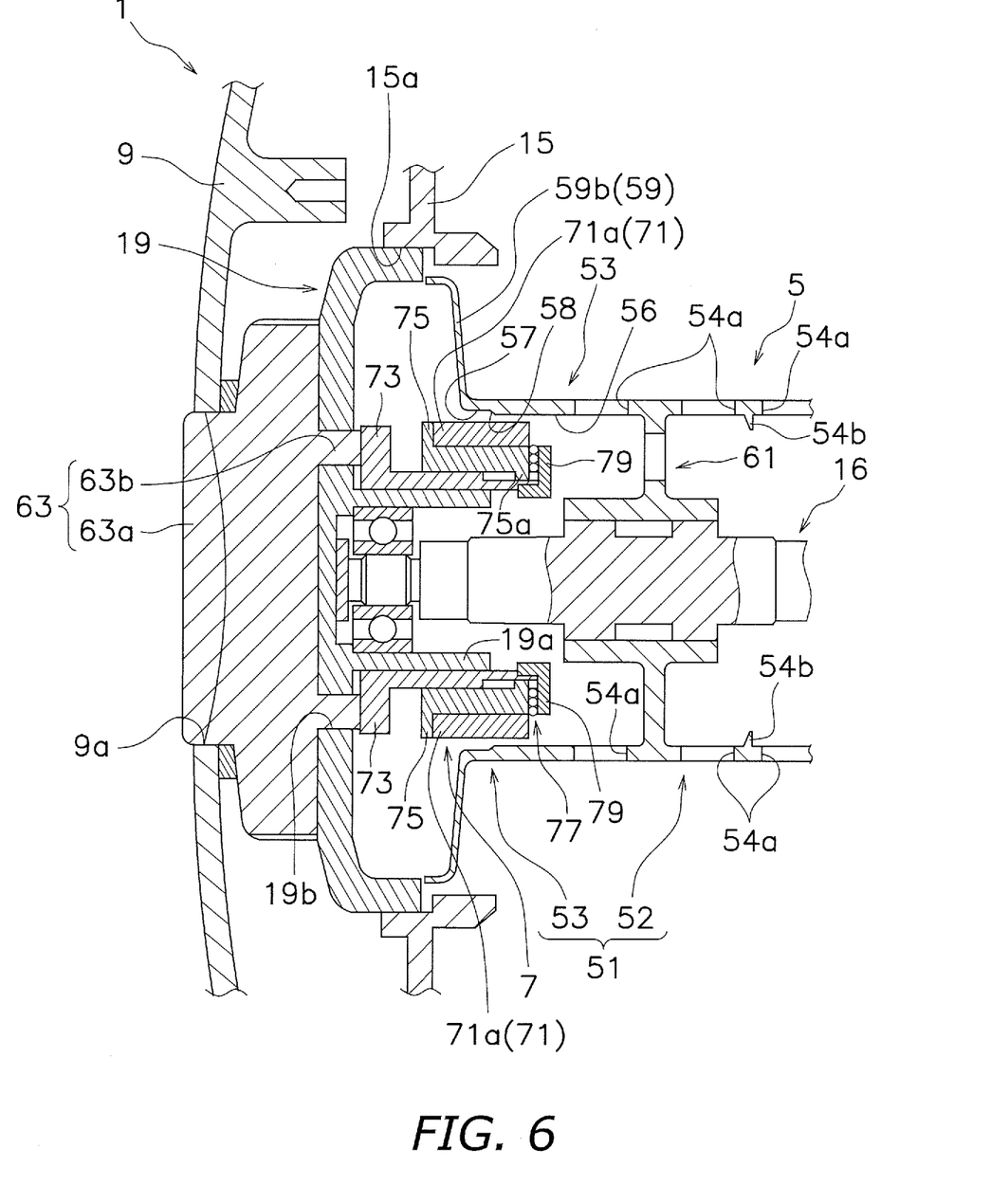
FIG. 6 is an enlarged cross-sectional view of the spool and the spool brake mechanism (in a condition that a second tubular part is axially moved)

As shown in FIG. 2, the spool brake mechanism 7 is disposed in the reel unit 1. When described in detail, as shown in FIGS. 5 and 6, the spool brake mechanism 7 is disposed in the reel unit 1 through the brake case 19. The brake case 19 includes a tubular part 19a and a plurality of through holes 19b. The spool brake mechanism 7 is mounted to the tubular part 19a. The tubular part 19a accommodates, in its inner peripheral part, the other bearing for supporting the spool shaft 16. The operating knob 63 (to be described) for operating the spool brake mechanism 7 is fitted to the plural through holes 19b.

Figure 7:
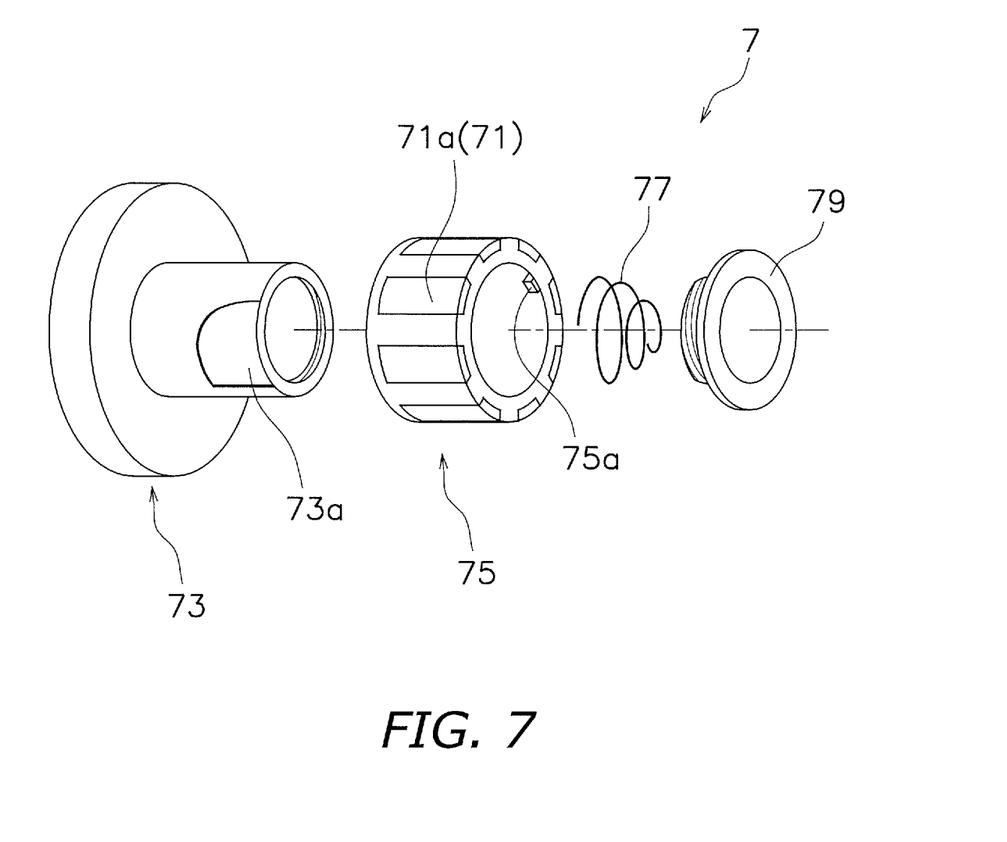
FIG. 7 is an exploded perspective view of the spool brake mechanism.

As shown in FIGS. 5 to 7, the spool brake mechanism 7 includes a magnetic component 71, a first tube 73 made in a tubular shape, a second tube 75 made in a tubular shape, a spring member 77 and a retaining member 79. It should be noted that the spool brake mechanism 7 may be herein regarded as an exemplary spool brake, or alternatively, the magnetic component 71 may be regarded as an exemplary spool brake.

The magnetic component 71 is configured to brake the rotation of the spool 5 by applying the magnetic force to the spool 5. The magnetic component 71 is composed of, for instance, a plurality of magnets 71a. For example, permanent magnets are used as the plural magnets 71a.

The plural magnets 71a are fixed to the outer peripheral part of the second tube 75. The plural magnets 71a are herein fixed to the outer peripheral part of the second tube 75 and are circumferentially aligned at predetermined intervals.

As shown in FIGS. 4 to 6, the plural magnets 71a can face the inner peripheral surface of the bobbin trunk 51 of the spool 5. When described in detail, the plural magnets 71a can face the inner peripheral surface of the non-bored tubular part 53 of the bobbin trunk 51. When described in more detail, the plural magnets 71a can face the small diameter part 56 of the non-bored tubular part 53.

As shown in FIGS. 5 and 6, the first tube 73 is mounted to the outer peripheral part of the tubular part 19a of the brake case 19. When described in detail, the inner peripheral part of the first tube 73 is mounted to the outer peripheral part of the tubular part 19a of the brake case 19. Specifically, as shown in FIG. 7, the first tube 73 includes an engaged part 73a. An engaging part 75a (to be described) of the second tube 75 is engaged with the engaged part 73a. For example, the engaged part 73a is made in a recessed shape.

As shown in FIGS. 5 and 6, the second tube 75 is mounted to the outer peripheral part of the first tube 73. When described in detail, the second tube 75 is mounted to the outer peripheral part of the first tube 73 while being axially movable and rotates relative to the first tube 73. Specifically, as shown in FIG. 7, the second tube 75 includes the engaging part 75a. The engaging part 75a is provided on the inner peripheral part of the second tube 75. The engaging part 75a is engaged with and is guided by the engaged part 73a provided on the first tube 73. This construction can be described in detail as follows. When the engaging part 75a is moved while being engaged with the engaged part 73a, the second tube 75 and the plural magnets 71a are axially moved while being rotated relative to the first tube 73.

As shown in FIGS. 5 to 7, the spring member 77 is a member for urging the second tube 75. When described in detail, the spring member 77 urges the second tube 75 toward the brake case 19 (to the left side in FIGS. 5 and 6). The spring member 77 is disposed between the retaining member 79 and the second tube 75. The spring member 77 is, for instance, a conical coil spring. The spring member 77 is made of, for instance, non-magnetic material such as SUS303 so as not to be attracted to the magnets 71a.

The retaining member 79 is a member for retaining the spring member 77. The retaining member 79 is mounted to the first tube 73. Specifically, the retaining member 79 is mounted to the first tube 73 by screwing a male threaded part of the retaining member 79 into a female threaded part of the first tube 73.

In the spool brake mechanism 7 constructed as described above, the braking force to be applied to the spool 5 is regulated in accordance with the rotation of the spool 5. This regulation can be described in detail as follows. When the spool 5 is rotated while the plural magnets 71a and the bobbin trunk 51 (the small diameter part 56 of the non-bored tubular part 53) of the spool 5 face each other in the radial direction, the braking force to be applied to the spool 5 is regulated in accordance with the rotational frequency (a rotational velocity) of the spool 5.

Specifically, when the spool 5 is rotated while being disposed in the magnetic field of the magnets 71a, eddy current is generated. The eddy current varies in accordance with the rotational frequency of the spool 5. Due to the eddy current herein generated, a force is applied to the spool 5 in the reverse direction to the rotational direction of the spool 5. Thus, the spool 5 is braked with the force varying in accordance with the rotational speed.

Then, a reaction force, corresponding to the braking force to be applied to the spool 5, acts on the second tube 75. The second tube 75 is rotated relative to the first tube 73 by this reaction force. The engaging part 75a is moved along the engaged part 73a in accordance with the amount of rotation of the second tube 75. Accordingly, the second tube 75 and the magnets 71a are axially moved while being rotated relative to the first tube 73.

This results in a variation of the area in which the bobbin trunk 51 (the small diameter part 56 of the non-bored tubular part 53) of the spool 5 and the magnets 71a face each other. Accordingly, the braking force to be applied to the spool 5 varies. It should be noted that this facing area corresponds to the area of a region radially facing the magnets 71a in the bobbin trunk 51 (the small diameter part 56 of the non-bored tubular part 53) of the spool 5.

The operating knob 63 is a component for setting the initial braking force to be applied to the spool 5. As shown in FIGS. 5 and 6, the operating knob 63 includes a knob part 63a made in a circular shape and a plurality of pressing parts 63b. The knob part 63a is exposed through an opening 9a provided through the first side cover 9. The plural pressing parts 63b respectively protrude from the knob part 63a. The plural pressing parts 63b are respectively inserted through the through holes 19b. The pressing parts 63b make contact with the first tube 73 and are capable of pressing the first tube 73.

The knob part 63a is rotatably supported by the opening 9a. The knob part 63a includes a cam mechanism (not shown in the drawings). The cam mechanism is configured to convert the rotation of the knob part 63a into the axial movement of the pressing parts 63b. With the aforementioned construction, when the knob part 63a is turned in the clockwise direction, the first tube 73 is pressed by the pressing parts 63b. Accordingly, the first tube 73, the second tube 75 and the magnets 71a are moved axially (rightward in FIG. 3) toward the spool 5. As a result, the number of the magnetic fluxes passing through the spool 5 increases and the initial braking force to be applied to the spool 5 is strengthened.

By contrast, when the knob part 63a is turned in the counterclockwise direction, the first tube 73, the second tube 75 and the magnets 71a are moved axially (leftward in FIG. 3) away from the spool 5. As a result, the number of the magnetic fluxes passing through the spool 5 decreases and the initial braking force to be applied to the spool 5 is weakened.

<Action of Dual-Bearing Reel>

A reel action will be hereinafter explained. Normally, the clutch yoke 39 is pressed inward and is set in a clutch-on state. As a result, the rotational force from the handle 3 is transmitted to the spool 5 through the drive shaft 30, the drive gear 35, the pinion gear 36 and the spool shaft 16. In other words, when the handle 3 is rotated, the spool 5 is rotated in the fishing-line winding direction.

In casting, the magnitude of the initial braking force is regulated by turning the operating knob 63 in order to inhibit the occurrence of a backlash. When it is demanded to inhibit the entire braking force, the operating knob 63 is required to be turned in the counterclockwise direction so as to separate the magnets 71a away from the spool 5. When the operating knob 63 is actually turned in the counterclockwise direction, the magnets 71a are moved in the separating direction from the spool 5 by the cam action. Accordingly, the number of the magnetic fluxes passing through the spool 5 decreases and the entire braking force is weakened.

Contrarily, when it is demanded to increase the entire braking force, the operating knob 63 is can be turned in the clockwise direction so as to make the magnets 71a approach the spool 5. When the operating knob 63 is actually turned in the clockwise direction, the magnets 71a are moved in the approaching direction to the spool 5 by the cam action. Accordingly, the number of the magnetic fluxes passing through the spool 5 increases, and the entire braking force is strengthened.

Subsequently, the clutch operating lever 26 is pressed downward. In conjunction with the movement of the clutch operating lever 26, the clutch yoke 39 is moved toward the handle 3, and the pinion gear 36 is moved in the same direction as the clutch yoke 39. As a result, a clutch-off state is established. In the clutch-off state, the rotation from the drive shaft 30 is not transmitted to the spool shaft 16 and the spool 5. Thus, the spool 5 becomes freely rotatable. Then, a fishing rod is cast in the clutch-off state, while thumbing of the spool 5 is performed and simultaneously the reel is tilted relative to the axial direction such that the spool shaft 16 is arranged along the vertical plane. Accordingly, a lure is thrown, while the spool 5 is rotated in the fishing-line releasing direction.

When the spool 5 is rotated with the magnets 71a facing the bobbin trunk 51 (the small diameter part 56 of the non-bored tubular part 53) of the spool 5, a braking force acts on the spool 5. While the spool 5 is thus braked, a reaction force varying in accordance with the braking force acts on the second tube 75. Then, the second tube 75 is rotated by the reaction force, and the engaging part 75a is guided and moved by the engaged part 73a. Accordingly, the second tube 75 and the magnets 71a are axially moved towards the handle 3 (i.e., rightward in FIG. 4).

When the rotational frequency (rotational velocity) of the spool 5 herein increases, the reaction force varying in accordance with the braking force also increases. The second tube 75 and the magnets 71a are thereby moved toward the inner peripheral part of the bobbin trunk 51 of the spool 5. Accordingly, the number of the magnetic fluxes acting on the spool 5 increases, and the braking force to be applied to the spool 5 is strengthened. By contrast, when the rotational frequency (rotational velocity) of the spool 5 decreases, the reaction force varying in accordance with the braking force decreases. In this case, the second tube 75 and the magnets 71a are axially moved away from the handle 3 by the spring member 77. Accordingly, the number of the magnetic fluxes acting on the spool 5 decreases and the braking force to be applied to the spool 5 is weakened. Thus, the braking force to be applied to the spool 5 is automatically regulated in accordance with the rotation of the spool 5.

<Comprehensive Explanation>

(1) The dual-bearing reel includes the reel unit 1, the handle 3, the spool 5 and the spool brake mechanism 7. The handle 3 is rotatably mounted to the reel unit 1. The spool 5 is disposed in the reel unit 1 and rotates with in conjunction with a rotation of the handle 3. The spool 5 includes the bobbin trunk 51 and a pair of the flanges 59 (the first flange 59a and the second flange 59b). The bobbin trunk 5 includes the bored tubular part 52 and the non-bored tubular part 53. The bored tubular part 52 includes at least one hole 54a. The non-bored tubular part 53 is integrated with the bored tubular part 52. The flanges 59 are respectively provided on both ends of the bobbin trunk 51. The spool brake mechanism 7 is disposed in the reel unit 1. The spool brake mechanism 7 is capable of braking the spool 5 by applying a magnetic force to at least the non-bored tubular part 53.

According to the dual-bearing reel, the bobbin trunk 51 includes the bored tubular part 52. Hence, the spool 5 can be produced having a lightweight construction. Additionally, the magnetic force of the spool brake mechanism 7 is applied to the non-bored tubular part 53 of the bobbin trunk 51. Hence, a braking force of a suitable magnitude can be applied to the spool.

(2) In the dual-bearing reel, the spool brake mechanism 7 is disposed in the reel unit 1 and can face the inner peripheral surface of the non-bored tubular part 53. Therefore, it is possible to achieve an advantageous effect of compactly producing the dual-bearing reel in addition to the aforementioned advantageous effect.

(3) In the dual-bearing reel, the bored tubular part 52 includes the rib 54b protruding radially inward from the inner peripheral surface thereof. Therefore, even when the bored tubular part 52 is provided with the at least one hole 54a, it is possible to reliably achieve a strength and a rigidity required for the bored tubular part 52. Additionally, even when the bored tubular part 52 is provided with the at least one hole 54a, it is possible to minimize a reduction in a strength and a rigidity between the bored tubular part 52 and the non-bored tubular part 53. In other words, it is possible to inhibit a difference in an amount of deformation between the bored tubular part 52 and the non-bored tubular part 53. Accordingly, the rib 54b is an example of a support means.

(4) In the dual-bearing reel, the rib 54b is an annular rib circumferentially extending on the inner peripheral surface of the bored tubular part 52. Therefore, it is possible to more effectively inhibit a difference in an amount of deformation between the bored tubular part 52 and the non-bored tubular part 53.

(5) In the dual-bearing reel, the inner peripheral surface of the non-bored tubular part 53 includes the small diameter part 56 and the large diameter part 57 having a larger diameter than the small diameter part 56. The spool brake mechanism 7 is disposed in the reel unit 1 and can face the small diameter part 56.

In this construction, it is possible to manage the magnetic force applied to the small diameter part 56 from the spool brake mechanism 7 with reference to a boundary between the small diameter part 56 and the large diameter part 57 on the inner peripheral surface of the non-bored tubular part 53. In other words, a braking force of a suitable magnitude can be applied to the spool 5.

(6) In the dual-bearing reel, the inner peripheral surface of the non-bored tubular part 53 includes the step 58 extending circumferentially. The step 58 connects the small diameter part 56 and the large diameter part 57. Even with this construction, advantageous effects similar to those described above can be achieved.

(7) In the dual-bearing reel, the small diameter part 56 is connected to the large diameter part 57 through the step 58, and the large diameter part 57 is provided continuously to one of the flanges 59 (the second flange 59b). Even with this construction, advantageous effects similar to those described above can be achieved.

(8) The spool 5 for the dual-bearing reel includes the bobbin trunk 51 made in a tubular shape and a pair of the flanges 59. The bobbin trunk 51 enables the fishing line to be wound about its outer periphery. The flanges 59 are respectively provided on both ends of the bobbin trunk 51.

The bobbin trunk 51 herein includes the bored tubular part 52 and the non-bored tubular part 53. The bored tubular part 52 is provided on one side closer to one of the flanges 59 (the first flange 59a side). The bored tubular part 52 includes the holes 54a in its outer periphery. The non-bored tubular part 53 is provided on the other side closer to the other of the flanges 59 (the second flange 59b side). When the magnetic component 71 (the magnets 71a) is disposed to face the inner peripheral surface of the non-bored tubular part 53 of the bobbin trunk 51 in this construction, it is possible to produce the dual-bearing reel having a lightweight construction, and simultaneously, to apply a braking force of a suitable magnitude to the spool 5 without adding a closed-end tubular conductor provided in a well-known art to the dual-bearing reel.

Other Preferred Embodiments (a) In the aforementioned preferred embodiment, the plural magnets 71a are disposed on the outer peripheral part of the second tube 75 and are circumferentially aligned at intervals. However, the number of the magnets 71a and the intervals among the magnets 71a can be arbitrarily set.

(b) The aforementioned preferred embodiment has exemplified the construction that the conical coil spring is employed as the spring member 77 in order to reliably move the second tube 75 in the axial direction by a sufficient distance. However, a coil spring with a constant contour can be employed as the spring member 77.

(c) The aforementioned preferred embodiment has exemplified the construction that the step 58 is provided between the small diameter part 56 and the large diameter part 57 on the inner peripheral surface of the bobbin trunk 51. Instead of the step 58 an annular groove can be provided between the small diameter part 56 and the large diameter part 57. In this construction, the corner P is formed by the small diameter part 56 and the wall of the annular groove. The corner P can be used as a reference for managing the magnetic force to be applied to the small diameter part 56 by the spool brake mechanism 7. Thus, the corner P of the aforementioned alternative embodiment is also an example of a referencing means.

(d) The aforementioned preferred embodiment has exemplified the construction that the plural holes 54a are provided in the axial range from the region located axially in the middle of the pair of flanges 59 to the first flange 59a. However, the region provided with the plural holes 54a is not limited to that of the aforementioned preferred embodiment. For example, the region provided with the plural holes 54a can be arbitrarily set as long as the plural holes 54a are disposed at least in the region located in the vicinity of the first flange 59a. For example, the plural holes 54a can be provided only in the region located in the vicinity of the first flange 59a without being provided in the region located axially in the middle of the pair of flanges 59.

(e) The aforementioned preferred embodiment has exemplified the construction that the rib 54b is provided on the inner peripheral surface of the bored tubular part 52 (the first body 54) and is made in an annular shape. However, the rib 54b can be made in an arbitrary shape. For example, the rib 54b can be intermittently provided on the inner peripheral surface of the bored tubular part 52 (the first body 54) in the circumferential direction.

(f) The aforementioned preferred embodiment has exemplified the construction that one rib 54b is provided on the inner peripheral surface of the bored tubular part 52 (the first body 54). However, the number of the ribs 54b can be arbitrarily set. For example, a plurality of ribs 54b can be provided on the inner peripheral surface of the bored tubular part 52 (the first body 54) while being aligned in the axial direction.

(g) The aforementioned preferred embodiment has exemplified the configuration that the spool brake mechanism 7 is configured to axially move the magnetic component 71 (the magnets 71a) in order to regulate the braking force to be applied to the spool 5. However, the spool brake mechanism 7 can be configured differently from this. For example, the magnetic component 71 (the magnets 71*a*) can be axially fixed in the position shown in FIGS. 4 and 6, and can be radially moved. Alternatively, a tubular shield plate can be provided radially between the magnetic component 71 (the magnets 71*a*) and the non-bored tubular part 53, and can be axially moved. In this construction, it is possible to regulate the number of the magnetic fluxes passing through the non-bored tubular part 53 without providing the step 58.

Overall, the present disclosure is widely applicable to dual-bearing reels.

What is claimed is:

1. A dual-bearing reel, comprising:
   a reel unit;
   a handle rotatably mounted to the reel unit;
   a spool in the reel unit, the spool rotatable in conjunction with a rotation of the handle, the spool including a bobbin trunk and a pair of flanges, the flanges respectively provided on ends of the bobbin trunk, the bobbin trunk including a bored tubular part and a non-bored tubular part, the bored tubular part including at least one hole, the non-bored tubular part integrated with the bored tubular part; and
   a spool brake in the reel unit, the spool brake configured to brake the spool by applying a magnetic force to at least the non-bored tubular part.

2. The dual-bearing reel according to claim 1, wherein the spool brake faces an inner peripheral surface of the non-bored tubular part.

3. The dual-bearing reel according to claim 1, wherein
   an inner peripheral surface of the non-bored tubular part includes a small diameter part and a large diameter part having a larger diameter than the small diameter part, and
   the spool brake faces the small diameter part.

4. The dual-bearing reel according to claim 3, wherein
   the inner peripheral surface of the non-bored tubular part includes a step extending circumferentially about the inner peripheral surface of the non-bored tubular part, and
   the step connects the small diameter part and the large diameter part.

5. The dual-bearing reel according to claim 4, wherein the large diameter part is adjacent to one of the flanges.

6. The dual-bearing reel according to claim 1, wherein the at least one hole is a through hole in an outer periphery of the bored tubular part.

7. The dual-bearing reel according to claim 6, wherein the bored tubular part is closer to one of the pair of flanges, and the non-bored tubular part is closer to the other one of the pair of flanges.

8. The dual-bearing reel according to claim 7, wherein the bobbin trunk has a tubular shape, a fishing line to be wound about an outer periphery of the bobbin trunk.

9. A dual-bearing reel, comprising:
   a reel unit;
   a handle rotatably mounted to the reel unit;
   a spool in the reel unit, the spool rotatable in conjunction with a rotation of the handle, the spool including a bobbin trunk and a pair of flanges, the flanges respectively provided on ends of the bobbin trunk, the bobbin trunk including a bored tubular part and a non-bored tubular part, the bored tubular part including at least one hole, wherein the bored tubular part includes a rib protruding radially inward from an inner peripheral surface of the bored tubular part, the non-bored tubular part integrated with the bored tubular part; and
   a spool brake in the reel unit, the spool brake configured to brake the spool by applying a magnetic force to at least the non-bored tubular part.

10. The dual-bearing reel according to claim 9, wherein the rib is an annular rib circumferentially extending on the inner peripheral surface of the bored tubular part.

11. A spool for a dual-bearing fishing reel which is magnetically braked by a magnetic force of a spool brake mechanism, the spool comprising:
    a bobbin trunk having a tubular shape, a fishing line to be wound about an outer periphery of the bobbin trunk; and
    a pair of flanges on ends of the bobbin trunk respectively, the bobbin trunk including a bored tubular part and a non-bored tubular part, the bored tubular part closer to one of the pair of flanges and having a through hole in an outer periphery of the bored tubular part, the non-bored tubular part closer to the other one of the pair of flanges, wherein the non-bored tubular part is affected by the magnetic force of the spool brake mechanism.

12. The spool according to claim 11, wherein the bored tubular part includes a rib protruding radially inward from an inner peripheral surface of the bored tubular part.

13. The spool according to claim 12, wherein the rib is an annular rib circumferentially extending on the inner peripheral surface of the bored tubular part.

14. The spool according to claim 11, wherein an inner peripheral surface of the non-bored tubular part includes a small diameter part and a large diameter part having a larger diameter than the small diameter part.

15. The spool according to claim 14, wherein the inner peripheral surface of the non-bored tubular part includes an annular groove extending circumferentially about the inner peripheral surface of the non-bored tubular part, and
    the annular groove connects the small diameter part and the large diameter part.

16. The spool according to claim 15, wherein the large diameter part is adjacent to the other one of the pair of flanges.

17. The spool according to claim 14, wherein
    the inner peripheral surface of the non-bored tubular part includes a step extending circumferentially about the inner peripheral surface of the non-bored tubular part, and
    the step connects the small diameter part and the large diameter part.

18. The spool according to claim 11, wherein the bobbin trunk comprises a non-magnetic conductor.

* * * * *